Feb. 3, 1959 — D. K. HUZEL ET AL — 2,871,670
PROCESS OF LIQUEFIED GAS PUMPING
Filed April 20, 1953

INVENTORS
DIETER K. HUZEL
ROBERT M. SHUMAN
BY
ATTORNEY

United States Patent Office 2,871,670
Patented Feb. 3, 1959

2,871,670

PROCESS OF LIQUEFIED GAS PUMPING

Dieter K. Huzel, Reseda, Calif., and Robert M. Shuman, Tucson, Ariz., assignors to North American Aviation, Inc.

Application April 20, 1953, Serial No. 349,776

2 Claims. (Cl. 62—55)

This invention concerns a means and method for decreasing impediments to the flow of a fluid through a pipe, which are caused by the generation of vapors within the pipe when the medium surrounding the pipe is at a temperature above the boiling point of the liquid flowing through the pipe, and particularly this invention concerns a means and method for eliminating impediments to the flow of liquid gases through a pipe.

When an ordinary pipe is used to carry a flowing liquid, and when the temperature of the medium surrounding the pipe is above the boiling temperature of the liquid, heat enters the pipe all along the surface and keeps the liquid boiling in the boundary zone adjacent the wall of the pipe. The vapors which result go up the pipe. As long as the pipe is straight, vertical and of sufficient width, no difficulties are encountered. However, if these conditions are not present, and in particular if there are bends and cavities, such as those presented by a pump, large amounts of vapor are trapped in the lower portion which causes heavy knocks when the vapors are finally released and the liquids reenter the cavity which was created. This invention contemplates a means and method for eliminating the harmful effects which are usually present when a pipe which contains a fluid is subjected to temperatures which are above the boiling point of the liquid, and particularly when the fluid is first static then caused to start flowing.

It is therefore an object of this invention to provide a method for decreasing the harmful effects caused by vaporization within a fluid in a pipe surrounded by a medium which is at a temperature above the boiling point of the liquid.

It is another object of this invention to provide means for eliminating interference with the flow of a liquid through a pipe which is surrounded by a medium at a temperature above the boiling temperature of the liquid.

It is another object of this invention to provide a means for eliminating hammer effects caused by the formation of gas within a fluid pipe due to the presence of temperatures within the medium surrounding the pipe which are above the boiling point of the liquid.

It is another object of this invention to provide a method for eliminating hammer effects caused by the formation of gas within a fluid pipe due to the presence of temperatures within the medium surrounding the pipe which are above the boiling point of the liquid.

It is another object of this invention to provide means for improving the flow characteristics of a liquid in a pipe surrounded by a medium at a temperature above the boiling temperature of the liquid.

It is another object of this invention to provide a means for decreasing the harmful effects of vapor formation within a liquid flowing in a pipe surrounded by a medium which is at a temperature above the boiling temperature of the liquid.

It is another object of this invention to provide a method for improving the flow characteristics of a liquid through a pipe which is surrounded by a medium which is at a temperature above the boiling temperature of the liquid.

It is another object of this invention to improve the flow characteristics of liquid oxygen through a pipe.

It is another object of this invention to provide a means for improving the flow characteristics of liquid nitrogen through a pipe.

It is another object of this invention to provide a means for improving the flow characteristics of a liquefied gas through a pipe.

It is another object of this invention to provide a method for improving the flow characteristics of liquid oxygen through a pipe.

It is another object of this invention to provide a method for improving the flow characteristics of liquid nitrogen through a pipe.

It is another object of this invention to provide a method for improving the flow characteristics of liquid gas through a pipe.

Other objects of invention will become apparent from the following description taken in connection with the accompanying drawings, in which—

Figures 1, 2:
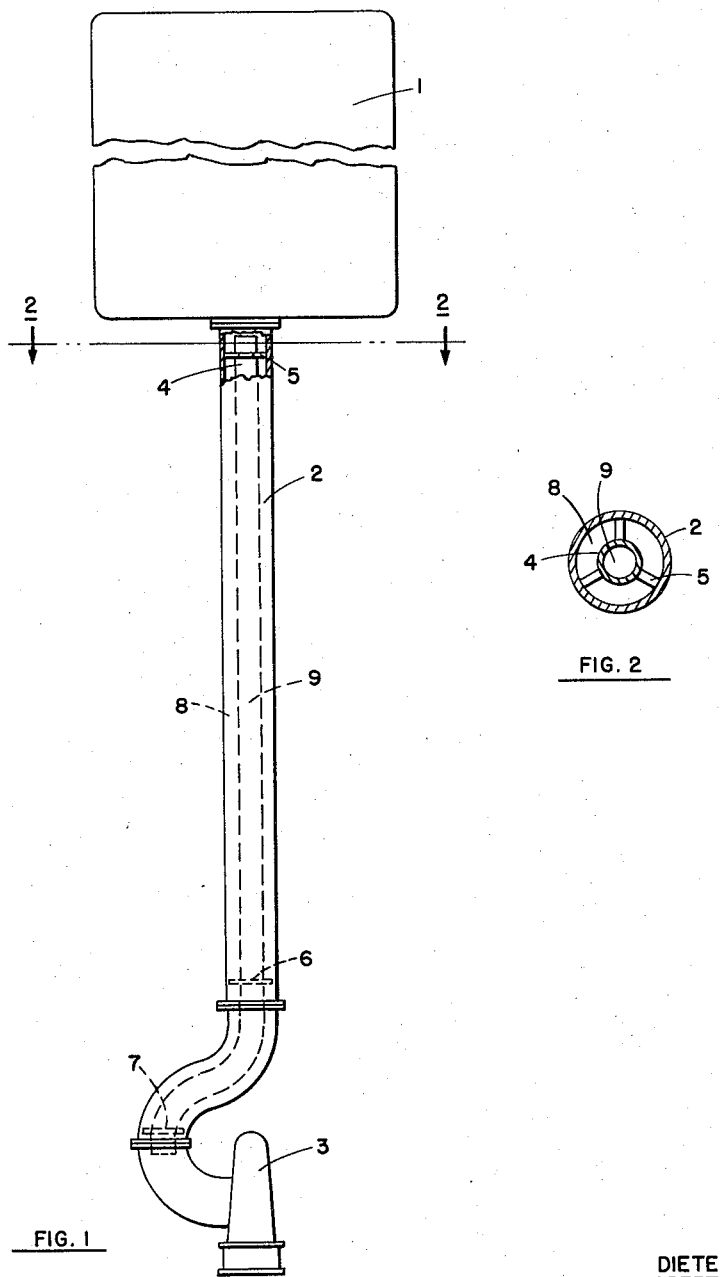
Fig. 1 is a side view of a typical embodiment of this invention.
Fig. 2 is a view taken at 2—2 in Fig. 1.

In Fig. 1, tank 1 contains a liquid, which has a boiling temperature below the temperature of the medium surrounding pipe 2. Pipe 2 carries the liquid, for example, liquid nitrogen or liquid oxygen, to pump 3. An internal pipe 4 is positioned concentrically to outer pipe 2. Inner pipe 4 is spaced from and supported by outer pipe 2 by means of spacers 5, 6 and 7, one of which is shown more particularly in Fig. 2. Pipe 4 is preferably very thin to conserve weight. The only function of pipe 4 is to separate portion 8 from portion 9 of the flowing liquid. Pipe 4 is open at both ends so that inner portion 9 of the flowing liquid communicates with outer portion 8. After pump 3 is in operation, portion 8 flows in the same direction as portion 9. Thus, the flow of liquid divides at one end of pipe 4 into portions 8 and 9 which flow in the same direction. Spacers 5 are only strong enough to hold inner pipe 4 in position and the cross-section area of spacer 5 is small compared to the cross-section area between pipes 4 and 2.

In operation, before the fluid starts to flow and pump 3 starts to pump, vapor is generated in liquid column 8 which effectively insulates the fluid within pipe 4 from the outside temperature. A pressure difference develops between liquid column 9 and liquid column 8 because column 9 maintains its full hydraulic head, while column 8 recedes. Fresh liquid emerges from the inner pipe at its lower end and circulates into the space of liquid column 8 to fill the void. This results in a continuous circulation between the inside of pipe 4 downward and the volume between pipe 2 and pipe 4 upward. Hence, accumulation of large amounts of vapor is prevented. The temperature in the lower portion of pipe 2 adjacent pump 3 is maintained below the boiling point of the liquid, because of the circulation of the liquid just described, thereby preventing cavitation within pump 3 and improving its starting characteristics.

The device of this invention provides a means and method of preventing large accumulations of vapor within a pipe which normally contains a liquid when the medium surrounding the pipe it at a temperature above the boiling temperature of the liquid within the pipe.

Although the invention has been described and illustrated in detail, it is to be clearly understood that the same is by way of illustration and example only and is not to be taken by way of limitation, the spirit and scope of this invention being limited only by the terms of the appended claims.

We claim:

1. The process of preventing cavitation of a low boiling point liquefied gas wherein a low boiling point liquefied gas being fed to a pump forms gaseous voids in a pipe leading to said pump, comprising passing a liquefied gas into the pipe said gas being at a temperature substantially below ambient air temperature surrounding said pipe, providing a second pipe open at both ends and substantially concentric to and within said first-mentioned pipe, maintaining sufficient heat input from the ambient air to an annular space between said pipes to generate vapor therein and circulate the liquefied gas down said second pipe and up the annular space between said first-mentioned pipe and said second pipe whereby said gaseous voids are prevented from entering said pump.

2. The process of preventing flashing of a low boiling point liquefied gas in the vicinity of a pump suction whereby in said liquefied gas flashes into a gas in a pipe leading to said pump, said pump being in a surrounding medium wherein the ambient temperature is higher than the boiling point of said liquid gas, comprising passing the liquefied gas into the pipe, providing a second pipe open at both ends and substantially concentric to and within said first-mentioned pipe, flowing the liquid down said second pipe, maintaining the temperature of said liquefied gas below the boiling point in said second pipe, and maintaining sufficient heat input from said surrounding medium to an annular space between said pipes to generate vapor in said space and to circulate said liquefied gas downward in said second mentioned pipe and upward into said annular space whereby vaporless liquid is supplied to said pump.

References Cited in the file of this patent

UNITED STATES PATENTS

| | | |
|---|---|---|
| 1,160,703 | Fleming | Nov. 16, 1915 |
| 1,739,161 | McKee | Dec. 10, 1929 |
| 2,306,298 | Curtis | Dec. 22, 1942 |
| 2,332,694 | Campbell | Oct. 26, 1943 |
| 2,340,747 | Hanson | Feb. 1, 1944 |
| 2,601,763 | Peff | July 1, 1952 |